(12) United States Patent
Schultink et al.

(10) Patent No.: US 11,602,252 B2
(45) Date of Patent: Mar. 14, 2023

(54) VACUUM CLEANER FILTER BAG MADE FROM RECYCLED PLASTIC

(71) Applicant: Eurofilters N.V., Overpelt (BE)

(72) Inventors: Jan Schultink, Overpelt (BE); Ralf Sauer, Overpelt (BE)

(73) Assignee: EUROFILTERS N.V., Overpelt (BE)

( * ) Notice: Subject to any disclaimer, the term of this patent is extended or adjusted under 35 U.S.C. 154(b) by 109 days.

(21) Appl. No.: 16/085,439

(22) PCT Filed: Mar. 15, 2017

(86) PCT No.: PCT/EP2017/056128
§ 371 (c)(1),
(2) Date: Sep. 14, 2018

(87) PCT Pub. No.: WO2017/158026
PCT Pub. Date: Sep. 21, 2017

(65) Prior Publication Data
US 2019/0082913 A1    Mar. 21, 2019

(30) Foreign Application Priority Data

Mar. 17, 2016  (EP) .................................. 16160921
Mar. 17, 2016  (EP) .................................. 16160922
(Continued)

(51) Int. Cl.
*A47L 9/14*       (2006.01)
*B01D 39/16*      (2006.01)

(52) U.S. Cl.
CPC .............. *A47L 9/14* (2013.01); *B01D 39/163* (2013.01); *B01D 2239/0283* (2013.01); *B01D 2239/065* (2013.01)

(58) Field of Classification Search
CPC ........................... B01D 39/18; B01D 39/163; B01D 2239/065; B01D 2239/0283;
(Continued)

(56) References Cited

U.S. PATENT DOCUMENTS 5,549,957 A * 8/1996 Negola .................... D01F 8/06
                                                428/370
6,171,369 B1 * 1/2001 Schultink ................ B32B 29/02
                                                95/57
(Continued)

FOREIGN PATENT DOCUMENTS

CN     101684634 A    3/2010
CN     101747596 A    6/2010
(Continued)

OTHER PUBLICATIONS

Lueger; Encyclopedia of the entire technology: Staple Fiber 600 (Neuschappe); downloaded from the Internet on Aug. 29, 2019 at http://www.zeno.org/Lueger-1904/A/Stapelfaser; 1920; including English translation.
(Continued)

*Primary Examiner* — Jason M Greene
(74) *Attorney, Agent, or Firm* — Crowell & Moring LLP

(57) ABSTRACT

The present invention relates to a vacuum cleaner filter bag composed primarily of plastic recyclates.

13 Claims, 4 Drawing Sheets

(30) Foreign Application Priority Data

| Jul. 11, 2016 | (EP) | 16178839 |
|---|---|---|
| Jul. 11, 2016 | (EP) | 16178856 |
| Oct. 6, 2016 | (EP) | 16192650 |
| Oct. 6, 2016 | (EP) | 16192651 |

(58) Field of Classification Search
CPC .... B01D 2239/0435; B01D 2239/0233; B01D 2239/0225; B01D 2239/1233; B01D 39/1615; B01D 39/1623; B01D 2239/0241; A47L 9/14
See application file for complete search history.

(56) References Cited

U.S. PATENT DOCUMENTS

| 2004/0132376 A1* | 7/2004 | Haworth | D04H 1/549 442/364 |
|---|---|---|---|
| 2004/0211160 A1 | 10/2004 | Rammig et al. | |
| 2007/0175817 A1 | 8/2007 | Goldman | |
| 2009/0031683 A1* | 2/2009 | Schultink | A47L 9/14 55/382 |
| 2009/0223190 A1* | 9/2009 | Nauta | D04H 1/64 55/524 |
| 2011/0030557 A1 | 2/2011 | Brownstein et al. | |
| 2012/0131890 A1* | 5/2012 | Schultink | A47L 9/14 55/368 |
| 2012/0211625 A1* | 8/2012 | Schultink | A47L 9/1445 248/311.2 |
| 2012/0234748 A1* | 9/2012 | Little | B01D 39/1623 210/488 |
| 2013/0047856 A1* | 2/2013 | Takeuchi | A62B 23/025 96/17 |
| 2014/0120322 A1 | 5/2014 | Fu et al. | |
| 2014/0278142 A1 | 9/2014 | Danes et al. | |
| 2015/0017865 A1* | 1/2015 | Schroer | D01F 1/02 442/361 |

FOREIGN PATENT DOCUMENTS

| CN | 103654623 A | 3/2014 |
|---|---|---|
| CN | 105120977 A | 12/2015 |
| CN | 204973320 U | 1/2016 |
| CN | 105342526 A | 2/2016 |
| DE | 1 628 582 | 2/1968 |
| DE | 90 16 939 U1 | 5/1991 |
| DE | 44 15 350 A1 | 11/1995 |
| DE | 296 15 163 U1 | 1/1997 |
| DE | 2001 0049 U1 | 10/2000 |
| DE | 199 19 809 A1 | 11/2000 |
| DE | 199 48 909 A1 | 4/2001 |
| DE | 102 03 460 A1 | 8/2002 |
| DE | 10221694 A1 | 12/2003 |
| DE | 20 2006 020 047 U1 | 10/2007 |
| DE | 10 2006 037 456 A1 | 2/2008 |
| DE | 10 2006 055 890 A1 | 5/2008 |
| DE | 20 2008 003 248 U1 | 6/2008 |
| DE | 20 2008 005 050 U1 | 7/2008 |
| DE | 20 2008 004 733 U1 | 11/2008 |
| DE | 10 2008 046 200 A1 | 4/2009 |
| DE | 202008016836 U1 | 4/2009 |
| DE | 10 2007 062 028 A1 | 6/2009 |
| DE | 20 2008 006 904 U1 | 11/2009 |
| DE | 10 2008 041 227 A1 | 2/2010 |
| DE | 20 2008 018 054 U1 | 6/2011 |
| DE | 10 2010 060 175 A1 | 3/2012 |
| DE | 10 2011 008 117 A1 | 4/2012 |
| DE | 10 2010 060 353 A1 | 5/2012 |
| DE | 10 2011 105 384 A1 | 12/2012 |
| DE | 20 2013 001 096 U1 | 4/2013 |
| DE | 20 2011 052 208 U1 | 5/2013 |
| DE | 20 2013 100 862 U1 | 5/2013 |
| DE | 10 2012 012 999 A1 | 7/2013 |
| DE | 20 2013 103 508 U1 | 10/2013 |
| DE | 10 2014 109 596 A1 | 2/2015 |
| DE | 20 2015 101 218 U1 | 5/2015 |
| DE | 20 2014 100 563 U1 | 6/2015 |
| EP | 0 758 209 A1 | 11/1995 |
| EP | 0 960 645 A2 | 12/1999 |
| EP | 0960645 A2 | 12/1999 |
| EP | 1 198 280 A1 | 1/2001 |
| EP | 1 137 360 A1 | 4/2001 |
| EP | 1 254 693 A2 | 11/2002 |
| EP | 1258277 A1 | 11/2002 |
| EP | 1 480 545 A1 | 9/2003 |
| EP | 1 795 247 A1 | 6/2007 |
| EP | 1 795 427 A1 | 6/2007 |
| EP | 1917895 B1 | 5/2008 |
| EP | 2004303 B1 | 12/2008 |
| EP | 2 011 556 A1 | 1/2009 |
| EP | 2 044 874 A2 | 4/2009 |
| EP | 2 123 206 A1 | 11/2009 |
| EP | 2 263 507 A1 | 12/2010 |
| EP | 2 263 508 A1 | 12/2010 |
| EP | 2 442 703 A1 | 12/2010 |
| EP | 2 301 404 A2 | 3/2011 |
| EP | 2 433 695 A1 | 3/2012 |
| EP | 3 219 373 A1 | 9/2017 |
| EP | 3 219 374 A1 | 9/2017 |
| EP | 3 219 375 A1 | 9/2017 |
| FR | 2 721 188 A1 | 12/1995 |
| WO | WO 01/003802 A1 | 1/2001 |
| WO | WO 03/073903 A1 | 9/2003 |
| WO | WO 07/121979 A1 | 11/2007 |
| WO | WO 11/047764 A1 | 4/2011 |
| WO | WO 11/057641 A1 | 5/2011 |
| WO | WO 13/106392 A2 | 7/2013 |
| WO | WO 2014/074398 A2 | 5/2014 |
| WO | WO2014074398 A2 | 5/2014 |
| WO | WO 2014/145804 A1 | 9/2014 |

OTHER PUBLICATIONS

Chinese Office Action from corresponding CN Application No. 201780017424.0, 19 pp., dated Nov. 24, 2021.
Notice of Opposition filed in EP counterpart Application No. EP 16 160 922.7 was filed Feb. 7, 2020; 10 pgs. (Translation attached).
European Standard No. DIN EN 15342: Plastics, Recycled Plastics, "Characterization of Polystyrene (PS) Recyclates," German Version 2007; ICS 13.030.50; 83.080.20; Dec. 2007; 28 pages. (Translation attached).
European Standard No. DIN EN 15344: Plastics, Recycled Plastics, "Characterization of Polyethylene (PE) Recyclates," German Version 2007; ICS 13.030.50; 83.080.20; Dec. 2007; 34 pages. (Translation attached).
European Standard No. DIN EN 15345: Plastics, Recycled Plastics, "Characterization of Polypropylene (PP) Recyclates," German Version 2007; ICS 13.030.50; 83.080.20; Dec. 2007; 28 pages. (Translation attached).
European Standard No. DIN EN 15346: Plastics, Recycled Plastics, "Characterization of Poly (vinyl chloride) (PVC); Recyclates," German Version 2014; ICS 13.030.50; 83.080.20; Nov. 2014; 56 pages. (Translation attached).
European Standard No. DIN EN 15353: Plastics, Recycled Plastics, "Guidelines for the Development of Standards Relating for Recycled Plastics"; German Version CEN/TR 15353:2007; ICS 01.120; 13.030.50; 83.080.01; (Feb. 2007; 25 pages. (Translation attached).
Chinese Office Action dated Jun. 24, 2020 on CN Appl. No. 201780017424.0 (Translation attached).
Examination Report No. 1 dated Feb. 19, 2021, in corresponding Australian Application No. 2017232262 (5 pages).
Second Office Action dated Mar. 10, 2021, in corresponding Chinese Application No. 2017-80017424.0 (12 pages) (English translation attached).
European Standard DIN EN 15347:2007 (Translation attached).
Ostbayerische Technische Hochschule Amberg-Weiden, "Studieninhalt Studiengang Kunststofftechnik", [gefunded09.09.2020] Fundstelle: [http://www.oth-aw.de/studiengaenge-und-bildungsangbote/

(56) References Cited

OTHER PUBLICATIONS studienangebote/bachelor-studiengaenge/kunststofftechnik/studineinhalte/] (Translation attached).
Gutachten zur Auswertung von Recyclingstandards von Prof. Dr.-Ing. H.-J. Endres (May 27, 2020) (Translation attached).
International Search Report dated Jul. 14, 2017 for International Application No. PCT/EP2017/056128.
East Bavarian Technical College: construction course in plastics technology East Bavarian Technical University Amberg-Weiden; Study content for the course of plastics technology; downloaded from the internet on May 23, 2019 at https://www.oth-aw.de/studiengaenge-und-bildungsangebote/studienangebote/bachelor-studiengaenge/kunststofftechnik/aufbau/; 10 pages including English translation.
European Standard No. DIN EN 15347: Plastics, Recycled Plastics, Characterisation of Plastics Wastes, English Version; ICS 13.030.50; 83.080.01; Feb. 2008; 12 pages.
Shen, Li et al.; "Open-loop recycling: A LCA case study of PET bottle-to-fibre recycling"; Resources, Conservation and Recycling, vol. 55; Nov. 1, 2010; pp. 34-52.
DIN EN 15347, 2007, Feb. 2008.
Li, Shen et al., "Open-loop recycling: A LCA case study of PET bottle-to-fibre recycling," Resources, Conservation and Recycling, Jun. 30, 2010, 19 pages.
DIN EN 15342, Feb. 2008.
DIN EN 15345, Feb. 2008.
DIN EN 15344, Feb. 2008.
DIN EN 15346, Jan. 2015.
DIN-Fachbericht CEN/TR 15353, Apr. 2007.
Mitteiluna aema.B Reael 71 (3) EPU.
Google, "Google Abfrage RPET DIN EN 15353:2007", [gefunden27.07.2021].
Pfaendner, Rudolf et al., "Recycling and Restabilization of Polymers for High Quality Applications—An Overview," Die Angewandte Makromolekulare Chemie, vol. 232, No. 4140, 1995.
Pospisil, Jan et al., "Upgrading of recycled plastics by restabilization—an overview," Polymer Dearadation and Stability, 1995.
La Mantia, Francesco Paolo et al., "The Role of Additives in the Recycling of Polymers," Macromol. Symp., vol. 135, 1998.
Pospisil, Jan et al., "The Origin and Role of Structural Imhomogenitties and Impurities in Material Recycling of Plastics," Macromol. Symp., vol. 135, 1998.
Jannsson, Anna et al., "Chemical degradation of a polypropylene material exposed to simulated recycling" Polymer Degradation and Stability, vol. 84, 2004.
Hinsken, Hans et al., "Degradation of Polyolefins during Melt Processing," Polymer Degradation and Stability, vol. 34, 1991.
Stangenberg, F. et al., "Quality Assessments of Recycled Plastics by Spectroscopy and Chromatography," Chromatographia, vol. 59, 2004.
Wanderson, Romao et al., "Distinguishing between virgin and post-consumption bottle-grade poly (ethylene terephthalate) using thermal properties," Polymer Testing, vol. 29, 2010.
Mansor, Muhd Ridzuan et al., "Thermal and Mechanical Behaviour of Recycled Polypropylene/Polyethylene Blends of Rejected-Unused Disposable Diapers," Journal of Advanced Manufacturing Technology, Jan. 3, 2020.
Curtzwiler, Greg W., "Certification markers for empirical quantification of post-consumer recycled content in extruded polyethylene film" Polymer Testing, vol. 65, 2018.
Verordnung (EG) Nr. 282/2008 Der Kommission.
Gutachten.
Albrecht, W. et al., "Nonwoven Fabrics" Wiley-VCH, 2003 ISBN: 3-527-30406-1.
Hutten, Irvin M., "Handbook of Nonwoven Filter Media" Buttenworth-Heinemann, 2016 ISBN: 978-0-08-098301-1.
Erganzende Stellunanahme zu dem Gutachten, Herrn Dr. Ina. Guru Geertz.
Gutachten Prof. Dr.-Ina. H.J. Endres vom May 27, 2020.
Erganzende wissenschaftliche Stellungnahme Prof. Dr.-Ing. H. J. Endres vom Aug. 3, 2021.
Textile Science and Clothing Technoloav—ISSN 2197-9863.
Jan Dantz, "Begründung," 19 pages.
Einspruch gegen ein europaisches Patent regarding EP16160922.7 dated May 8, 2019, 6 pages.
Opposition Filing Documents.

\* cited by examiner

VACUUM CLEANER FILTER BAG MADE FROM RECYCLED PLASTIC

This application claims the benefit under 35 U.S.C. § 371 of International Application No. PCT/EP2017/056128, filed Mar. 15, 2017, which claims the priority of European Patent Application No. 16160922.7, filed Mar. 17, 2016; European Patent Application No. 16160921.9, filed Mar. 17, 2016; European Patent Application No. 16178839.3, filed Jul. 11, 2016; European Patent Application No. 16178856.7, filed Jul. 11, 2016; European Patent Application No. 16192650.6, filed Oct. 6, 2016; European Patent Application No. 16192651.4, filed Oct. 6, 2016, which are incorporated by reference herein in their entirety.

The present invention relates to a vacuum cleaner filter bag composed primarily of plastic recyclates.

Filter bags made of nonwovens have almost completely replaced paper filter bags in the past 10 years because of their far superior performance characteristics. More particularly, their collection efficiency, tendency toward clogging, and mechanical strength are being continuously improved. As a rule, the nonwovens used for this purpose are composed of thermoplastic resins, in particular polypropylene (PP) and/or polyester (PET).

Although there is still room for improvement of these characteristics, it is already noticeable that the high cost of complex filter construction is finding less and less acceptance with the end consumer.

In addition, the use of high-quality and heavy nonwovens for disposable products is coming under ever-increasing criticism for ecological reasons.

Biodegradable filter bags such as those proposed in EP 2301404 and WO 2011/047764 also do not appear to constitute a promising approach for improving ecological properties, as filter bags are often disposed of via waste incineration and composting is already out of the question because of the simple fact that the collected material is primarily non-biodegradable.

At present, nonwoven filter bags for vacuum cleaners are always composed of multiple layers (EP 1198280, EP 2433695, EP 1254693). In order to achieve the necessary mechanical strength, support layers, coarse filter layers that show high dust storage capacity without an accompanying excessive increase in air resistance, and fine filter layers for the filtration of particles <1 µm in size are used.

Over the past several decades, in order to improve storage capacity, additional diffusors and separating walls have been used in filter bags in an effort to optimize flow conditions in the filter bag and thus increase service life.

A wide variety of technologies are used to produce these different materials. Meltblown nonwoven fabrics are usually used as a fine filter layer. These meltblown nonwoven fabrics are extrusion nonwovens, are usually composed of polypropylene, and have filament diameters in the range of less than 1 µm to a few µm. In order to achieve high collection efficiency, these materials are electrostatically charged (e.g. by means of corona discharge). In order to further improve collection efficiency, it was proposed to apply nanofibers produced by the electrospinning process to nonwoven carrier materials (DE 19919809).

For the capacity layer, both carded staple fiber nonwovens and extrusion nonwoven fabrics, but also fiber webs (EP 1795247), are used as staple fibers or filaments. The materials generally used for capacity layers are polypropylene or polyester, but also fluff pulp (EP 0960645, EP 1198280).

Use of recycled plastics (e.g. recycled polyethylene terephthalate (rPET)) for fabrics was proposed in WO 2013/106392.

The use of rPET as a raw material for meltblown-nonwovens has already been studied (Handbook of Nonwovens, Woodhead Publishing Ltd., Ed. by S. J. Russelt, Chapter 4.10.1).

CN 101747596 describes the use of recycled PET or recycled PBT (rPET/rPBT) as materials for microfilaments.

Based on this, the object of the present invention is thus to provide vacuum cleaner filter bags that equal or exceed the vacuum cleaner filter bags currently on the market in terms of dust removal performance and service life and thus show outstanding performance characteristics, but are composed primarily of recycled materials or waste materials. More particularly, the object of the present invention is therefore to provide vacuum cleaner filter bags that are particularly advantageous both ecologically and economically. The content of recycled materials in the filter bag should preferably be 40% to 95%. Such a filter bag would thus meet the Gold, Silver, or Bronze Global Recycling Standard (GRS).

This object is achieved by means of the vacuum cleaner filter bag according to claim 1. Here, the dependent claims constitute advantageous embodiments. Claim 13 further gives possible applications of recycled plastics for vacuum cleaner filter bags. Claim 15 describes a special bicomponent fiber.

The invention thus relates to a vacuum cleaner filter bag that comprises a wall surrounding an inner space composed of an air-permeable material. An inlet opening is made in the wall via which e.g. a connecting piece can be inserted into the vacuum cleaner filter bag. In this case, the air-permeable material of the wall comprises at least one layer of a nonwoven fabric and/or one layer of a fiber web, wherein the nonwoven fabric or the fiber web comprise(s) or is/are composed of fibers that comprise one recycled plastic or a plurality of recycled plastics or are composed of one recycled plastic or a plurality of recycled plastics.

In this context, the term "recycled plastic" used for the purposes of the present invention is to be understood as a synonym for plastic recyclates. Reference is made to the standard DIN EN 15347:2007 for definition of this term.

Here, the vacuum cleaner filter bag according to the present invention comprises a wall composed of an air-permeable material, which for example can have a multi-layer structure. At least one of these layers is a nonwoven fabric or a fiber web that comprises recycled plastics and in particular is composed of recycled plastics. In contrast to the vacuum cleaner filter bags known from the prior art, therefore, less or even no fresh (virgin) plastic material is used to produce the nonwovens or fiber webs on which the wall of the vacuum cleaner filter bag is based, with plastics being primarily or exclusively used that have already been used and have been recovered by means of corresponding recycling methods. Such filter bags are clearly advantageous from an ecological standpoint, as they can be produced to a large extent in a raw-material-neutral manner. These filter bags also provide economic benefits, as most recycled plastic materials can be obtained much less expensively than corresponding raw materials that are not recycled ("virgin" plastics).

In the context of the present invention, a nonwoven fabric refers to a tangled laid fabric that has been subjected to a strengthening step so that it has sufficient strength to be wound onto and off rollers, for example. A fiber web corresponds to a tangled laid fabric, which, however, has not been subjected to a strengthening step, so that in contrast to a nonwoven fabric, such a tangled laid fabric does not have sufficient strength to be wound onto and off rollers, for example. With respect to the definitions of these terms, reference is made to EP 1795427 A1, the disclosed contents of which are hereby incorporated into the subject matter of the present patent application in this respect.

According to a preferred embodiment, the fibers of the nonwoven fabric or the fiber web contained in the air-permeable material of the wall of the vacuum cleaner filter bag according to the invention comprise a recycled plastic or a plurality of recycled plastics. This is particularly the case in bicomponent fibers, in particular of the core-sheath type, wherein at least the core of these bicomponent fibers is composed of a recycled plastic or a plurality of recycled plastics. More particularly, the core in this case is composed of recycled PET (rPET), wherein the sheath can be composed of fresh plastic material, such as e.g. polypropylene.

The bicomponent fibers can be in the form of staple fibers or be configured as an extrusion nonwoven fabric (for example a meltblown nonwoven fabric), so that the bicomponent fibers are theoretically of infinite length and constitute so-called filaments. In such bicomponent fibers, it is advantageous if at least the core is composed of a recycled plastic, and for the sheath, for example, one can also use a virgin plastic, but another recycled plastic can also be used as an alternative.

According to a further preferred embodiment, the fibers of the nonwoven fabric or the fiber web that are contained in the air-permeable material of the wall of the vacuum cleaner filter bag according to the invention are composed of one individual recycled plastic material.

Alternatively, however, it is also preferable for the fibers of the nonwoven fabric or the fiber web to be composed of different materials, at least one of which is a recycled plastic. In this case, two embodiments in particular are conceivable:

On the one hand, a mixture at least two fiber types can be used, for example fiber mixtures composed of at least two different recycled plastics.

For the purposes of the present invention, the nonwovens or fiber webs may be dry-laid, wet-laid, or extrusion nonwoven fabrics. Accordingly, the fibers of the nonwovens or fiber webs may have finite lengths (staple fibers), but may also theoretically be of infinite length (filaments).

Moreover, it is possible for the air-permeable materials of the wall of the vacuum cleaner filter bag to comprise at least one layer of a nonwoven fabric that contains fibrous and/or powdered recycled material from the production of textiles, in particular cotton textiles and/or cotton linters. In this case, the fibrous and/or powdered recycled material can in particular be textile fibers and/or cotton powder.

Figure 1:
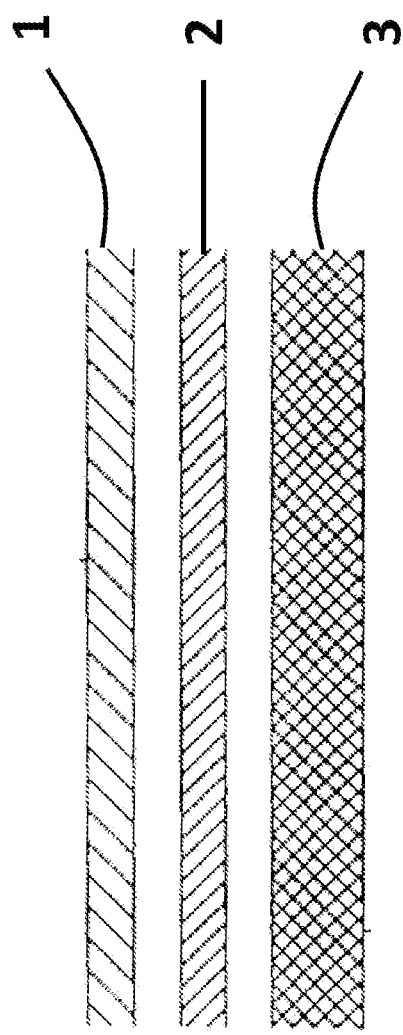
FIG. 1 shows a layer structure of the filter material according to one form of the present disclosure including a spun-bonded fabric layer, a fine filter layer, and a capacity layer.

The drawings described herein are for illustration purposes only and are not intended to limit the scope of the present disclosure in any way.

DETAILED DESCRIPTION

Here, such a nonwoven fabric is bonded by means of binder fibers, for example "fusion fibers" or bicomponent fibers, producing fibrous and/or powdered recycled material or cotton linters in bonded form. The fusion fibers or bicomponent fibers should preferably comprise at least one recycled plastic. Corresponding nonwoven materials are known, for example, from WO 2011/057641 A1. The nonwoven materials according to the invention can also be correspondingly configured.

For example, the air-permeable material can comprise at least one layer of a nonwoven fabric that contains powdered and/or fibrous recycled material from the production of textiles, in particular cotton textiles and/or cotton linters.

Fibrous and/or powdered recycled material from the production of textiles is produced in particular in processing of textile materials, such as e.g. the production, cutting, drying, or recycling of textile materials. More particularly, both pre- and post-consumer textile waste materials can be used in this case as recycled materials.

For example, recycled textile materials (produced as cuttings in the production of textiles) can be used for producing the fibrous and/or powdered recycled materials. The fibrous and/or powdered recycled material can be obtained for example by reclaiming the textile fiber composite from the textile materials. This reclamation is preferably carried out by shredding or using a hammer mill. In this case, the fiber composite is decomposed down to the individual fiber. This material, i.e. the fibrous and/or powdered recycled material, is also referred to as "reclaimed fiber" and can be laid into a fiber web for the purposes of the present invention, for example in a web laying process (in particular by means of an airlaid process or a cross-lapping process) and optionally bonded into a nonwoven fabric and used as a material layer for a vacuum cleaner filter bag. For the purposes of the present invention, such reclaimed fibers show an extremely positive property profile. The mechanical stress they undergo during production leads to a broad spectrum of fiber lengths, also including extremely short fibers. This provides a large surface, and because of this, extremely high dust storage capacity. Moreover, fiber and sheet pieces that are not completely decomposed are present and in this form result in special and advantageous matrix formation.

In particular, such reclaimed fibers thus include textile fibers of cotton, polyester, elastane, flax, linen, hemp, camel hair, lama, mohair, polyamide, polyethylene, ramie, silk, viscose, jute, coconut, modal, polyacrylic, polypropylene, sheep's wool, sisal, goat hair, and cotton powder as well as mixtures and combinations thereof.

For example, waste materials that may be deposited on machines or filter materials used for the processing of textiles are suitable as possible further fibrous and/or powdered materials for the purposes of the present invention. The powders or fibers are ordinarily disposed of and thermally recovered.

Cotton linters are short cotton fibers that adhere to the cottonseed core after the long seed hair (cotton) is removed from said core. Cotton linters vary widely in their fiber length (1 to 6 mm) and degree of purity, cannot be spun, and in the textile industry are normally a non-recoverable residual material and thus a waste product. Cotton linters can also be used for the nonwovens that may be included in air-permeable materials for the vacuum cleaner filter bag according to the present invention.

In the nonwoven layer contained in the air-permeable material, the fibrous and/or powdered recycled material or the cotton linters is/are bonded. The nonwoven material has thus been subjected to a binding step. In this case, binding of the fibrous and/or powdered recycled materials and/or the cotton linters is preferably carried out by adding binder fibers, which for example are thermally activated, to the nonwoven layer.

The production of a corresponding nonwoven layer can thus be carried out in that for example, the fibrous and/or powdered recycled material and/or the cotton linters are deposited in a crosslaid or airlaid process together with the binder fibers and subsequently—if nonwoven fabric is to be produced from the fiber web—bonded to the finished nonwoven fabric by thermal activation of the binder fibers.

In a preferred embodiment, it is provided that the layer of the nonwoven fabric containing at least one fibrous and/or powdered recycled material and/or cotton linters comprises or is composed to 95 wt %, preferably 70 to 90 wt %, of the fibrous and/or powdered recycled materials and/or cotton linters and to at least 5 wt %, preferably 10 to 30 wt %, of binder fibers, in particular bicomponent fibers.

In this case, the binder fibers can e.g. constitute so-called "fusing fibers", which are composed of thermoplastic meltable materials. These fusing fibers melt during thermal activation and bind the fibrous and/or powdered recycled material or the cotton linters.

The fusing fibers or bicomponent fibers preferably used as binder fibers may be partially or completely composed of recycled plastics. Particularly advantageous are bicomponent fibers the core of which is composed of recycled polyethylene terephthalate (rPET), with the sheath being composed of polypropylene, which may be a "virgin" material as well as a recycled material.

In a preferred embodiment, the binder fibers are staple fibers, in particular with a length of 1 to 75 mm, preferably 2 to 25 mm.

Particularly preferably, the recycled plastic in this case is selected from the group composed of recycled polyesters, in particular recycled polyethylene terephthalate (rPET), recycled polybutylene terephthalate (rPBT), recycled polylactic acid (rPLA), recycled polyglycolide and/or recycled polycaprolactone; recycled polyolefins, in particular recycled polypropylene (rPP), recycled polyethylene and/or recycled polystyrene (rPS); recycled polyvinyl chloride (rPVC), recycled polyamides as well as mixtures and combinations thereof.

For many plastic recyclates, there are applicable international standards. For PET-plastic recyclates, for example, DIN EN 15353:2007 is applicable. PS recyclates are described in further detail in DIN EN 15342:2008. PE recyclates are dealt with in DIN EN 15344:2008. PP recyclates are characterized in DIN EN 15345:2008. PVC recyclates are described in further detail in DIN EN 15346:2015. With respect to the corresponding special plastic recyclates, the present patent application incorporates the definitions of these international standards. The plastic recyclates in this case can be non-metallized. An example of this are plastic flakes or chips recovered from PET beverage bottles. The plastic recyclates can also be metallized, e.g. if the recyclates are obtained from metallic plastic films, in particular metallized PET films (MPET).

More particularly, the recycled plastic is recycled polyethylene terephthalate (rPET), which is obtained from beverage containers, in particular from so-called bottle flakes, i.e. pieces of ground beverage containers.

The recycled plastics, in particular the recycled PET, both in metallized and non-metallized form, can be spun into the corresponding fibers, from which the corresponding staple fibers or meltblown or spunbonded nonwovens for the purposes of the present invention can be produced.

It is preferable for the air-permeable material to have a multilayer structure, wherein at least one, a plurality, or all of the layers comprise a nonwoven fabric and/or a fiber web or are composed thereof, and wherein the nonwoven fabric or the fiber web comprises or is composed of fibers composed of one recycled plastic or a plurality of recycled plastics.

On the whole, the structure of the wall of the filter bag according to the present invention can also be configured as described in EP 1795247. Such a wall thus comprises at least three layers, wherein at least two layers are composed of at least one nonwoven layer and at least one fiber web layer comprises staple fibers and/or filaments. Accordingly, the wall of the vacuum cleaner filter bag is also characterized by having a welded connection in which all of the layers of the filter material are connected to one another by weld points. In this case, the pressure area of the welding pattern accounts for at most 5% of the area of the filter material or vacuum cleaner filter bag through which flow can pass. Based on the entire area of the filter bag through which flow can pass, there are at most 19 weld points per 10 cm$^2$.

For example, the air-permeable material can be configured as described in the introductory section of the present patent application, i.e. for example as described in EP 1198280, EP 2433695, EP 1254693, DE 19919809, EP 1795247, WO 2013/106392 or CN 101747596, provided that a plastic recyclate is used for the production of these filter materials. With respect to the detailed structure of these filter materials, reference is made to the disclosed contents of these documents, which in this respect are also incorporated into the disclosed contents of the present invention.

The present invention preferably includes multiple particularly preferred possibilities for the multilayer embodiment of the air-permeable material, which will be presented below. The majority of these layers can be connected to one another by means of weld points, in particular as described in EP 1795427 A1. The layers can also be glued to one another or bonded as described in WO 01/003802.

A corresponding nonwoven produced by bonding of fibrous and/or powdered recycled materials generated in production of textiles and bicomponent fibers is particularly suitable as a capacity layer in a vacuum cleaner filter bag according to the invention. Such a nonwoven fabric can also have additional components, such as e.g. microstaple fibers, crimp-staple fibers, fibers with a non-round cross-section, spinning waste, etc. added to it.

Figure 2:
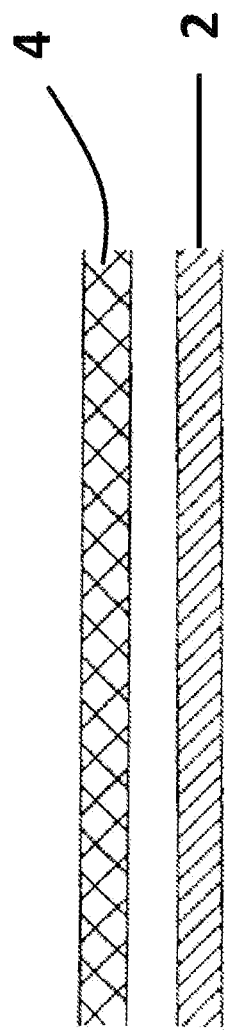
FIG. 2 shows a combination of a support layer and a fine filter layer.

According to a first preferred embodiment, shown in FIG. 2, the air-permeable material comprises at least one support layer 4 and at least one fine filter layer 2, wherein at least one or all of the support layers and/or at least one or all of the fine filter layers are nonwovens composed of one recycled plastic or a plurality of recycled plastics.

Figure 3:
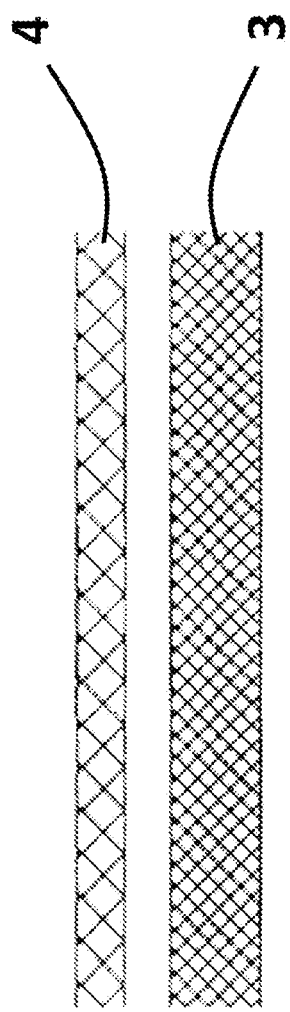
FIG. 3 shows a combination of a support layer and a capacity layer.

According to a second preferred embodiment, shown in FIG. 3, the air-permeable material comprises at least one support layer 4 and at least one capacity layer 3, wherein at least one or all of the support layers are nonwovens and/or at least one or all of the capacity layers are nonwovens or fiber webs composed of one recycled plastic or a plurality of recycled plastics.

Figure 4:
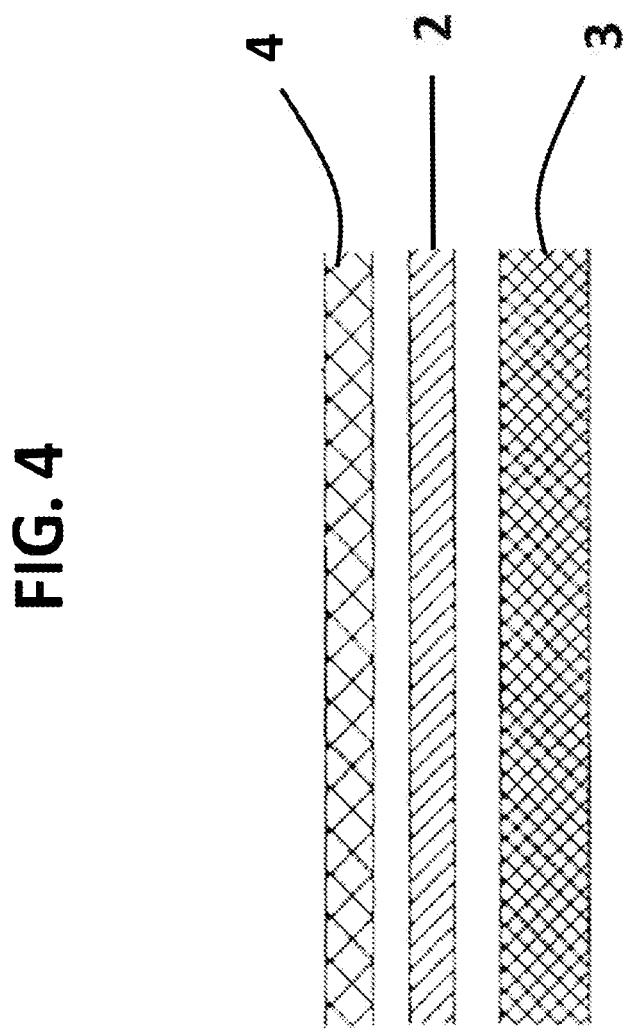
FIG. 4 shows a combination of a support layer, a fine filter layer, and a capacity layer.

An equally preferred third embodiment, shown in FIG. 4, provides that the air-permeable material comprises at least one support layer 4, at least one fine filter layer 2 and at least one capacity layer 3, wherein at least one or all of the support layers and/or at least one or all of the fine filter layers are nonwovens composed of one recycled plastic or a plurality of recycled plastics and/or at least one or all of the capacity layers are nonwovens or fiber webs composed of one recycled plastic or a plurality of recycled plastics.

In the two above-mentioned embodiments, it is also preferable for at least one, preferably all of the capacity layers to comprise or be composed of the fibrous and/or powdered recycled material and/or cotton linters. In this case, because of the web bonding, the nonwoven layer configured as a capacity layer shows such high mechanical strength that it can function as a support layer.

It is also possible for the outer layer on the clean air side to be composed of a relatively thin material based on linters and/or cotton powder. A spunbonded fabric comprising recycled fibrous and/or powdered material is also suitable as an outer layer.

A further preferred embodiment provides that the air-permeable material has an outer layer of a spunbonded fabric 1, one or two fine filter layers 2, and an inner capacity layer 3. Here, the spunbonded fabric layer 1 comprises or is composed of the fibrous and/or powdered recycled material and/or cotton linters. The fine filter layer(s) 2 is/are preferably composed of a meltblown, in particular a meltblown of rPET or rPP. The capacity layer 3 is e.g. a nonwoven composed of reclaimed fibers produced from textiles that are bonded to bicomponent fibers. In this case, the bicomponent fibers preferably have a core of rPET and a sheath of fresh PP.

The individual layers in this case will now be discussed in greater detail according to their function.

A support layer in the context of the present invention is a layer that imparts to the multilayer composite of the filter material the necessary mechanical strength. This refers to an open, porous nonwoven fabric or a nonwoven with a low weight per unit area. First and foremost, a support serves to support other layers or coatings and protect them from abrasion. The support layer can also filter out the largest particles. The support layer, like every other layer of the filter material, can also optionally be electrostatically charged, provided that the material has suitable dielectric properties.

A capacity layer provides high resistance to impact loads, filters large dirt particles, filters a significant portion of small dust particles, and stores or holds back large amounts of particles, wherein the air is allowed simply to flow through, thus resulting in a lower pressure drop with a higher particle load. This has a particular effect on the service life of a vacuum cleaner filter bag.

A fine filter layer serves to increase the filtration performance of the multilayer film material by capturing particles that for example penetrate the support layer and/or the capacity layer. In order to further increase collection efficiency, this layer can further be charged, preferably electrostatically (e.g. by corona discharge), in order in particular to increase the collection of fine dust particles.

An overview of the individual functional layers in multilayer filter materials for vacuum cleaner filter bags is provided in WO 01/003802. Regarding its design, the air-permeable material of the wall of the vacuum cleaner filter bag according to the invention can be constructed for example as described in this patent document, provided that at least one of the layers described therein of the multilayer filter material for the vacuum cleaner filter bag is composed of a recycled plastic or a plurality of recycled plastics. With respect to the construction of the air-permeable filter material, the disclosed contents of WO 01/003802 are also incorporated into the present application.

In the above-mentioned embodiments, it is advantageous for each support layer to be a spunbonded fabric or scrim, preferably with a basis weight of 5 to 80 $g/m^2$, more preferably 10 to 50 $g/m^2$, more preferably 15 to 30 $g/m^2$ and/or preferably with a titer of the fibers forming the spunbonded fabric or the scrim in the range of 0.5 dtex to 15 dtex.

In this case, the air-permeable material can preferably comprise one to three support layers.

If at least two support layers are present, the total basis weight of the total of all support layers is preferably 10 to 240 $g/m^2$, more preferably 15 to 150 $g/m^2$, more preferably 20 to 100 $g/m^2$, more preferably 30 to 90 $g/m^2$, in particular 40 to 70 $g/m^2$.

More particularly, it is preferable for all of the support layers to be composed of one recycled plastic or a plurality of recycled plastics, in particular rPET.

According to a further advantageous embodiment, each fine filter layer is an extrusion nonwoven fabric, in particular a meltblown nonwoven, preferably with a basis weight of 5 to 100 $g/m^2$, more preferably 10 to 50 $g/m^2$, in particular 10 to 30 $g/m^2$.

Here, it is possible for the air-permeable material to comprise 1 to 5 fine filter layers.

If at least two fine filter layers are present, the total basis weight of the total of all fine filter layers is preferably 10 to 300 $g/m^2$, more preferably 15 to 150 $g/m^2$, in particular 20 to 50 $g/m^2$.

More particularly, it is preferably if at least one, and preferably all fine filter layers, is/are composed of a recycled plastic or a plurality of recycled plastics, in particular of rPET.

In order to increase the dust collection efficiency, in particular with respect to extremely fine dust, it is particularly preferable if at least one, preferably all of the fine filter layers is/are electrostatically charged.

Furthermore, it is advantageous if each capacity layer is a staple fiber nonwoven, a fiber web, or a nonwoven fabric that comprises fibrous and/or powdered recycled material from the production of textiles, in particular cotton textiles and/or cotton linters, wherein each capacity layer preferably has a basis weight of 5 to 200 $g/m^2$, more preferably 10 to 150 $g/m^2$, more preferably 20 to 100 $g/m^2$, in particular 30 to 50 $g/m^2$.

In this case, the air-permeable material may comprise 1 to 5 capacity layers.

If at least two capacity layers are present, the total basis weight of the total of all capacity layers is preferably 10 to 300 $g/m^2$, more preferably 15 to 200 $g/m^2$, more preferably 20 to 100 $g/m^2$, in particular 50 to 90 $g/m^2$.

A particularly preferred embodiment of the structure of the air-permeable material for the vacuum cleaner filter bag according to the invention provides the multilayer structure described below, with a succession of layers from the inner space of the vacuum cleaner filter bag (dirty air side) to the outside (clean air side) as follows:

One support layer, at least one, preferably at least two fine filter layers, and one further support layer.

More particularly, if the support layer is configured as a spunbond nonwoven fabric and the fine filter layer is configured as a meltblown nonwoven fabric, this structure corresponds to the SMS or SMMS structure known from the prior art for air-permeable filter materials for vacuum cleaner filter bags.

Alternatively and in particular, the following structure is preferred: one support layer, at least one, preferably at least two capacity layers, preferably one further support layer, at least one, preferably at least two fine filter layers, and one further support layer. If the capacity layer has high mechanical strength as described above, the innermost support layer can also be dispensed with.

One or two capacity layers, one or two fine filter layers (meltblown layers), one support layer (spunbonded fabric).

One or two capacity layers, one or two fine filter layers (meltblown layers), one or two capacity layers.

Here, at least one of the layers comprises at least one recycled plastic material, in particular rPET. Particularly preferably, at least all of the support layers are composed of recycled plastics.

In this case, each of the above-mentioned layers (support layer, capacity layer, fine filter layer) can also be composed of a nonwoven material that comprises fibrous and/or powdered recycled material from the production of textiles, in particular cotton textiles and/or cotton linters.

In a particularly preferred embodiment, this nonwoven material forms the at least one capacity layer, while the other layers comprise no fibrous and/or powdered recycled material from the production of textiles, in particular cotton textiles and/or cotton linters.

All of the layers of the above-mentioned embodiments can also be connected to one another by welded connections, in particular as described in EP 1795427 A1. However, welded connections are not absolutely necessary.

According to a further preferred embodiment, the vacuum cleaner filter bag has a holding plate enclosing the inlet opening that is composed of one or a plurality of recycled plastics or comprises one or a plurality of recycled plastics. More particularly, the holding plate is composed of rPET or comprises rPET in a very high content, for example up to at least 90 wt %. According to this preferred embodiment, it is thus possible to further increase the content of recycled plastics in the vacuum cleaner filter bag.

Furthermore, it is possible for at least one flow distributor and/or at least one diffusor to be arranged in the inner space, wherein preferably the at least one flow distributor and/or the at least one diffusor is/are composed of a recycled plastic or a plurality of recycled plastics. Such flow distributors or diffusors are known for example from the patent applications EP 2263508, EP 2442703, DE 202006020047, DE 202008003248, and DE 202008005050. The vacuum cleaner filter bag according to the invention, including the flow distributor, can also be correspondingly configured.

The flow distributor and diffusors are preferably also produced from nonwovens or laminates of nonwovens. For these elements, the same materials are suitable as for the capacity and reinforcing layers.

In a further particularly preferred embodiment, it is provided that the percentage by weight of all recycled materials, based on the total weight of the vacuum cleaner filter bag, is at least 25%, preferably at least 30%, more preferably at least 40%, more preferably at least 50%, more preferably at least 60%, more preferably at least 70%, more preferably at least 80%, more preferably at least 90%, in particular at least 95%. In this manner, all of the classifications prescribed by the Global Recycle Standard (GRS) of Textile Exchange can be achieved.

For example, the vacuum cleaner filter bag according to the present invention can be configured in the form of a flat bag, a side folding bag, a block-bottom bag or a 3D bag, such as e.g. a vacuum cleaner filter bag for an upright vacuum cleaner. A flat bag has two side walls and is composed of two material layers, wherein the two material layers are directly connected to each other along their periphery, for example by welding or gluing. Side folding bags are a modified form of a flat bag and comprise side folds that are fixed in place or can be folded out. Block-bottom bags comprise a so-called box or block bottom, which ordinarily forms the narrow side of the vacuum cleaner filter bag; a holding plate is ordinarily arranged on this side.

The present invention also relates to the use of recycled plastics, in particular the above-described recycled plastics, for example in the form of nonwovens and/or fiber webs for vacuum cleaner filter bags. With respect to the recycled plastics that can be used for this purpose or the possible configuration of the nonwovens or fiber webs, reference is made to the above explanations in this regard.

The present invention will now be explained in further detail by means of the following embodiments as examples, without this limiting the invention to the particular embodiments presented.

Filter bags are devised in which one or a plurality of layers have rPET filaments or rPET staple fibers. In addition, the filter bags according to the invention described below may have one or a plurality of layers of an airlaid nonwoven fabric composed of cotton powder and bicomponent fibers. In this case, the various nonwovens are suitable only for certain material layers. In order to further increase the content of recycled raw materials, it is also possible to use a holding plate composed of rPET or at least comprising rPET.

Concerning the Individual Filter Layers:

Suitable in particular as support layers are spunbonded fabric layers of rPET with a weight per unit area of 5 to 50 g/m$^2$ and a titer of 1 dtex to 15 dtex. PET waste (e.g. stamping waste) and so-called bottle flakes, which are pieces of ground beverage bottles, are used as raw materials. In order to cover the different colors of the waste, the recyclates can be dyed. The HELIX® (Comerio Ercole) method is particularly advantageous as a thermal bonding method for connecting web fabrics to a spunbond.

As fine filter layers, one or a plurality of layers of a meltblown composed of rPET with a weight per unit area of 5 to 30 g/m$^2$ each is/are used. In addition, one or a plurality of meltblown nonwoven layers of PP can be present. At least these layer(s) are electrostatically charged by means of a corona discharge. The layers of rPET can also be electrostatically charged. It should only be noted that in this case, no metallized PET waste is used for production. Alternatively, the meltblown filaments can also be composed of bicomponent fibers in which the core is composed of rPET and the sheath of a plastic that can be electrostatically charged in a particularly favorable manner (e.g. PP, PC, PET).

One or a plurality of capacity layers comprise rPET staple fibers or rPET filaments or are produced based on cotton powder and bicomponent fibers. Various methods are suitable for the production of capacity layers. Commonly used methods are carding or airlaid methods in which stable fibers are first laid and are then ordinarily consolidated into a nonwoven fabric by means of a web binding step (e.g. by needle punching, hydroentanglement, ultrasound calendering, or also by means of thermal consolidation in the flow-through oven by means of bicomponent fibers or binder fibers). The HELIX® (Comerio Ercole) method is particularly advantageous for calendering.

Also used is a method in which the primary fiber web produced is not consolidated, but is attached to a nonwoven fabric with as many weld points as possible. Stable fibers of rPET can be used in both methods. Capacity layers can also be produced as extrusion nonwoven fabrics or extrusion fiber webs. rPET can also be used without problems for these nonwovens as well.

The filaments or staple fibers can also be in the form of bicomponent materials, in which the core is composed of rPET and the sheath of a plastic that can be electrostatically charged in a particularly favorable manner (e.g. PP, PC, PET).

Alternatively or additionally, one or a plurality of layers of an airlaid nonwoven fabric that are composed of bicomponent fibers and cotton powder can also be present.

The weight per unit area of the individual capacity layers is preferably between 10 and 100 g/m$^2$.

Of course, the various capacity layers produced can also be combined with one another.

In order to further increase the content of recyclates, it is possible to use a holding plate of rPET. If the component material performs the function of sealing to the vacuum cleaner connecting piece, the holding plate can be composed solely of rPET. If the sealing function has to be taken over by the holding plate, the TPE seal can be sprayed or glued on.

Therefore, when all possibilities are utilized, a content of recyclates or waste materials of up to 96% is possible. The following tables give several concrete examples with a recyclate content of 41% to 96%.

The vacuum cleaner filter bags presented below were designed from various recyclate-containing nonwovens or fiber webs using the materials indicated, and their exact composition or structure is shown in the following tables. These vacuum cleaner filter bags are flat bags with a rectangular geometry and dimensions of 300 mm×280 mm.

EXAMPLE 1

|  | Basis weight [g/m$^2$] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Inner support layer | 17 | 2.9 | 100 |
| Holding plate |  | 5.0 | 0 |
| Filter bag total |  | 17.1 | 41.3 |

The air-permeable material of the vacuum cleaner filter bag according to example 1 has a four-layer structure, wherein the outermost layer (clean air side) has a support layer with a basis weight of 25 g/m$^2$. The innermost layer is also a support layer with a basis weight of 17 g/m$^2$. Between the two support layers, two layers of a fine filter layer (meltblown of virgin polypropylene, each electrically charged by means of corona discharge) with a respective basis weight of 15 g/m$^2$ are arranged. The respective support layers are composed of 100% recycled PET. The third column gives the absolute weight of the respective layer in the vacuum cleaner filter bag. The vacuum cleaner filter bag has a holding plate that weighs 5.0 g and is welded to the vacuum cleaner filter bag.

With such a structure, a recycled material content of 41.3% in the vacuum cleaner filter bag as a whole can be achieved.

EXAMPLE 2

|  | Basis weight [g/m$^2$] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Inner support layer | 17 | 2.9 | 100 |
| Holding plate |  | 5.0 | 100 |
| Filter bag total |  | 17.1 | 70.5 |

The vacuum cleaner filter bag according to example 2 has the same structure as the vacuum cleaner filter bag according to example 1, except that the holding plate is composed to 100% of recycled polyethylene terephthalate (rPET). By means of this measure, the recyclate content of the vacuum cleaner filter bag as a whole can be increased to 70.5%.

EXAMPLE 3

|  | Basis weight [g/m$^2$] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 100 |
| Inner support layer | 17 | 2.9 | 100 |
| Holding plate |  | 5.0 | 100 |
| Filter bag total |  | 17.1 | 85.3 |

The vacuum cleaner filter bag according to example 3 has the same structure as in example 2. In contrast to example 2 or example 1, a fine filter layer (inner meltblown layer) is in this case also composed of 100% recycled PET. The rPET used can be metallized or non-metallized. If non-metallized rPET is used, it is also possible to electrostatically charge this meltblown, for example by means of corona discharge.

EXAMPLE 4

|  | Basis weight [g/m$^2$] | Weight per bag [g] | Content of recyclate [%] |
|---|---|---|---|
| Outer support layers | 25 | 4.2 | 100 |
| Meltblown | 15 | 2.5 | 85 |
| Meltblown | 15 | 2.5 | 85 |
| Inner support layer | 17 | 2.9 | 100 |
| Holding plate |  | 5.0 | 100 |
| Filter bag total |  | 17.1 | 95.6 |

The vacuum cleaner filter bag according to example 4 has the same structure as the vacuum cleaner bag according to example 2, except that the two fine filter layers (meltblown) are composed of BiCo filaments. The core of these meltblown filaments is composed of recycled PET and the sheath of new (virgin) polypropylene. The core accounts for a percentage by weight of 85%.

By means of such measures, a recyclate content of 95.6 wt % based on the vacuum cleaner filter bag as a whole is achieved.

EXAMPLE 5

|  | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer A | 35 | 5.9 | 50 |
| Capacity layer B | 35 | 5.9 | 50 |
| Inner support layer | 15 | 2.5 | 100 |
| Holding plate |  | 5.0 | 0 |
| Filter bag total |  | 31.4 | 49.3 |

The wall material of the vacuum cleaner filter bag according to example 5 has a 7-layer structure. Two fine filter layers (both meltblown layers as in example 1) are adjacent to the outer support layer on the clean air side. A support layer disposed in the middle separates these fine filter layers from two capacity layers A and B, each of which is a carded nonwoven fabric composed of bicomponent staple fibers. These staple fibers are composed e.g. to 50% of recycled polyethylene terephthalate (rPET), which forms the core of these fibers. The core is surrounded by a sheath of "virgin" PP. This is followed by a support layer disposed on the dirty air side.

In the structure according to example 5, all of the support layers of the air-permeable material are composed of recycled PET (rPET). The capacity layers are composed to 50% of recycled PET. With such a structure, a recyclate content of 49.3 wt % based on the vacuum cleaner filter bag as a whole is achieved.

EXAMPLE 6

|  | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer A | 35 | 5.9 | 100 |
| Capacity layer B | 35 | 5.9 | 100 |
| Inner support layer | 15 | 2.5 | 100 |
| Holding plate |  | 5.0 | 0 |
| Filter bag total |  | 31.4 | 68.0 |

The vacuum cleaner filter bag according to example 6 has the same structure as in example 5. In this case, in contrast to the embodiment according to example 5, the capacity layers A and B are also composed to 100% of a carded staple fiber nonwoven fabric of rPET staple fibers.

With such an embodiment, a recyclate content of 68.0 wt % based on the vacuum cleaner filter bag as a whole is achieved.

EXAMPLE 7

|  | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer A | 35 | 5.9 | 100 |
| Capacity layer B | 35 | 5.9 | 100 |
| Inner support layer | 15 | 2.5 | 100 |
| Holding plate |  | 5.0 | 100 |
| Filter bag total |  | 31.4 | 83.9 |

In the vacuum cleaner filter bag according to example 7, the holding plate is also composed to 100% of recycled PET. The vacuum cleaner filter bag otherwise has the same structure as in example 6.

With this structure, a total recyclate content of 83.9 wt % based on the vacuum cleaner filter bag as a whole can be achieved.

EXAMPLE 8

| Volume web 70 300 mm × 280 mm | Basis weight [g/m²] | Weight per bag [g] | Content of recyclate [%] |
|---|---|---|---|
| Outer support layers | 25 | 4.2 | 100 |
| Meltblown | 15 | 2.5 | 80 |
| Meltblown | 15 | 2.5 | 80 |
| Support layer middle | 17 | 2.9 | 100 |
| Capacity layer A | 35 | 5.9 | 100 |
| Capacity layer B | 35 | 5.9 | 100 |
| Inner support layer | 15 | 2.5 | 100 |
| Holding plate |  | 5.0 | 100 |
| Filter bag total |  | 31.4 | 96.8 |

The vacuum cleaner filter bag according to example 8 has the same structure as that of example 7, except that the two fine filter layers (meltblown layers) are also composed to a high degree of PET. The meltblown is composed of a bicomponent meltblown with a core of rPET surrounded by new polypropylene. The content of rPET is 80 wt % based on the total weight of the meltblown forming the respective fine filter layer.

With such an embodiment, a total recycled material content of 96.8 wt % based on the filter bag as a whole can be achieved.

EXAMPLE 9

|  | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer C | 35 | 5.9 | 80 |
| Capacity layer D | 35 | 5.9 | 80 |

-continued

| | Basis weight [g/m²] | Weight per bag [g] | Content of recyclate [%] |
|---|---|---|---|
| Inner support layer | 15 | 2.5 | 100 |
| Holding plate | | 5.0 | 0 |
| Filter bag total | | 31.4 | 60.5 |

The vacuum cleaner filter bag according to example 9 is also composed of a 7-layer air-permeable material. The vacuum cleaner filter bag has a structure similar to that of the vacuum cleaner filter bag according to example 5. The support layers and the fine filter layers (meltblown layers) are configured in the same manner as in example 5. The capacity layer C and D consists of a nonwoven material that is composed of 80 wt % of cotton powder and 20% BiCo binder fibers. This nonwoven material is described in detail in WO 2011/057641 A1. In this case, the content of the cotton powder in the capacity layers is counted toward the entire recyclate content.

With such an embodiment, a content of recycled material, i.e. total recycled plastics, and cotton powder of 60.5 wt % based on the vacuum cleaner filter bag as a whole can be achieved.

EXAMPLE 10

| | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer A | 35 | 5.9 | 100 |
| Capacity layer D | 35 | 5.9 | 80 |
| Inner support layer | 15 | 2.5 | 100 |
| Holding plate | | 5.0 | 0 |
| Filter bag total | | 31.4 | 64.3 |

The vacuum cleaner filter bag according to example 10 has a structure analogous to the vacuum cleaner filter bag according to example 9. In this case, the outer capacity layer corresponds to a capacity layer according to examples 6 to 8, i.e. a carded staple fiber nonwoven composed to 100% of fibers of recycled PET. The recyclate content of the finished vacuum cleaner filter bag is equivalent to 64.3 wt %.

EXAMPLE 11

| | Basis weight [g/m²] | Weight per bag [g] | Content of recyclate [%] |
|---|---|---|---|
| Outer support layers | 25 | 4.2 | 100 |
| Meltblown | 15 | 2.5 | 0 |
| Meltblown | 15 | 2.5 | 0 |
| Support layer middle | 17 | 2.9 | 100 |
| Capacity layer C | 35 | 5.9 | 80 |
| Capacity layer D | 35 | 5.9 | 80 |
| Inner support layer | 15 | 2.5 | 100 |
| Holding plate | | 5.0 | 100 |
| Filter bag total | | 31.4 | 76.4 |

The vacuum cleaner filter bag according to example 11 corresponds to a vacuum cleaner filter bag according to example 9, except that the holding plate is composed to 100% of rPET. The total content of recycled materials in this vacuum cleaner filter bag is 76.4 wt %.

EXAMPLE 12

| | Basis weight [g/m²] | Weight per bag [g] | Content of recyclate [%] |
|---|---|---|---|
| Outer support layers | 25 | 4.2 | 100 |
| Meltblown | 15 | 2.5 | 80 |
| Meltblown | 15 | 2.5 | 80 |
| Support layer middle | 17 | 2.9 | 100 |
| Capacity layer C | 35 | 5.9 | 80 |
| Capacity layer D | 35 | 5.9 | 80 |
| Inner support layer | 15 | 2.5 | 100 |
| Holding plate | | 5.0 | 100 |
| Filter bag total | | 31.4 | 89.3 |

The vacuum cleaner filter bag according to example 12 corresponds to the vacuum cleaner filter bag according to example 11, except that the two fine filter layers are configured according to the fine filter layers of example 8 and are thus composed of a bicomponent meltblown with a core of rPET and a sheath of polypropylene. The total content of recyclate in such a vacuum cleaner filter bag is 89.3 wt %.

The present invention also relates to a special bicomponent fiber, which in particular is suitable for the production of a nonwoven containing a fibrous and/or powdered recycled material from the production of textiles. Here, this bicomponent fiber is used for binding of the fibrous and/or powdered recycled material. This bicomponent fiber is of the core-sheath type (core-core bicomponent fiber) and comprises a core of a recycled plastic, particularly recycled polyethylene terephthalate (rPET) or recycled polypropylene (rPP).

A preferred embodiment provides that the sheath is composed of a fresh plastic (virgin plastic), in particular polypropylene.

In this case, the sheath can comprise the persistence additives, in particular magnesium stearate.

The percentage by weight of the core, based on the entire fiber, is preferably 50 to 95 wt %.

More particularly, the bicomponent fiber has a diameter of 0.5 to 10 µm. In particular, the bicomponent fiber has a circular section.

The invention claimed is:
1. A vacuum cleaner filter bag, comprising a wall surrounding an inner space comprising an air-permeable material and an inlet opening inserted into the wall,
wherein
the air-permeable material comprises at least one layer of a nonwoven fabric or one layer of a fiber web that comprises fibers or is composed thereof, said fabric or web comprising one recycled plastic or a plurality of recycled plastics or being composed of one recycled plastic or a plurality of recycled plastics,
wherein at least a part of the recycled plastic is present in the form of a bicomponent fiber of the core-sheath type (core-core bicomponent fiber), comprising a core of a recycled plastic, wherein the sheath is composed of a fresh plastic, and wherein in case of a nonwoven fabric said fibers are bonded by thermally activated bicomponent fibers.

2. The vacuum cleaner bag as claimed in claim 1, wherein the recycled plastic is selected from the group composed of recycled polyesters; recycled polyolefins; recycled polyvinyl chloride (rPVC), recycled polyamides, and mixtures and combinations thereof.

3. The vacuum cleaner bag as claimed in claim 1, wherein the air-permeable material has a multilayer structure, wherein at least one, a plurality, or all of the layers comprise a nonwoven fabric or a fiber web or are composed thereof, wherein the nonwoven fabric or the fiber web comprises or is composed of fibers that comprise one recycled plastic or a plurality of recycled plastics or are composed of one recycled plastic or a plurality of recycled plastics.

4. The vacuum cleaner bag as claimed in claim 1, wherein the air-permeable material comprises:
at least one spunbonded fabric layer, at least one fine filter layer and at least one capacity layer,
or
at least one support layer and at least one fine filter layer, wherein at least one or all of the support layers or at least one or all of the fine filter layers are nonwovens composed of one recycled plastic or a plurality of recycled plastics,
or
at least one support layer and at least one capacity layer, wherein at least one or all of the support layers are nonwovens or at least one or all of the capacity layers are nonwovens or fiber webs composed of one recycled plastic or a plurality of recycled plastics,
or
at least one support layer, at least one fine filter layer and at least one capacity layer, wherein at least one or all of the support layers or at least one or all of the fine filter layers are nonwovens composed of one recycled plastic or a plurality of recycled plastics or at least one or all of the capacity layers are nonwovens or fiber webs composed of one recycled plastic or a plurality of recycled plastics.

5. The vacuum cleaner bag as claimed in claim 4, wherein
a) each support layer is a spunbonded fabric or scrim,
b) the air-permeable material comprises 1 to 3 support layers,
c) if at least two support layers are present, the total basis weight of the total of all support layers is 10 to 240 g/m2, or
d) all of the support layers are composed of one recycled plastic or a plurality of recycled plastics.

6. The vacuum cleaner bag as claimed in claim 4 wherein
a) each fine filter layer is an extrusion nonwoven fabric,
b) the air-permeable material comprises 1 to 5 fine filter layers,
c) if at least two fine filter layers are present, the total basis weight of the total of all fine filter layers is 10 to 300 g/m2,
d) at least one fine filter layers is composed of a recycled plastic or a plurality of recycled plastics, or
e) at least one fine filter layer is electrostatically charged.

7. The vacuum cleaner bag as claimed in claim 4, wherein
a) each capacity layer is a staple fiber nonwoven, a fiber web, or a nonwoven fabric that comprises fibrous or powdered recycled material from the production of textiles or cotton linters, wherein each capacity layer preferably has a basis weight of 5 to 200 g/m2,
b) the air-permeable material comprises 1 to 5 capacity layers, or
c) if at least two capacity layers are present, a total basis weight of a total of all capacity layers is 10 to 300 g/m2.

8. The vacuum cleaner bag as claimed in claim 1, wherein the air-permeable material has a multilayer configuration with the following succession of layers, from the inner space of the vacuum cleaner filter bag outward:
one support layer, at least one fine filter layer, and one further support layer,
or
one support layer, at least one capacity layer, at least one fine filter layer, and one further support layer.

9. The vacuum cleaner bag as claimed in claim 1, wherein the vacuum cleaner filter bag has a holding plate enclosing the inlet opening that is composed of one or a plurality of recycled plastics or comprises one or a plurality of recycled plastics.

10. The vacuum cleaner bag as claimed in claim 1, wherein at least one flow distributor or at least one diffusor is arranged in the inner space.

11. The vacuum cleaner bag as claimed claim 1, wherein the percentage by weight of all recycled materials, based on a total weight of the vacuum cleaner filter bag, is at least 25%.

12. The vacuum cleaner bag as claimed in claim 1, wherein the vacuum cleaner filter bag comprises a flat bag, a block-bottom bag or a 3D bag.

13. The vacuum cleaner filter bag as claimed in claim 2, wherein the recycled polyesters are selected from recycled polyethylene terephthalate (rPET), recycled polybutylene terephthalate (rPBT), recycled polylactic acid (rPLA), recycled polyglycolide or recycled polycaprolactone; and wherein the recycled polyolefins are selected from recycled polypropylene (rPP), recycled polyethylene or recycled polystyrene (rPS).

* * * * *